United States Patent Office 2,830,984
Patented Apr. 15, 1958

2,830,984

ARABINOFURANOSYL PURINES

Bernard Randall Baker, Birmingham, Ala., and Robert Eugene Schaub, Paramus, N. J., assignors to American Cyanamid Company, New York, N. Y., a corporation of Maine No Drawing. Application March 11, 1955
Serial No. 493,812

4 Claims. (Cl. 260—211.5)

This invention relates to a series of new organic compounds. More particularly, this invention is concerned with certain 3′-acetamino-β-D-arabinofuranosyl purines, intermediates therefor and methods for their preparation.

In the copending application of Bernard R. Baker, Joseph P. Joseph and Robert E. Schaub, Serial No. 405,236, filed January 20, 1954, now abandoned, there is disclosed a series of aminoglycosidopurines which are useful in the treatment of trypanosomiasis. These compounds, of which 6-dimethylamino-9-(3′-amino-β-D-ribofuranosyl)purine may be cited as a specific example, are prepared by condensing a chloromercuripurine with a completely acylated haloamino sugar, and then deacylating the resultant product to obtain the desired aminoglycosidopurine. For example, dibenzoyl-3-acetamino-D-ribofuranosyl chloride-titanium chloride complex may be obtained by treatment of the corresponding glycoside with titanium tetrachloride in ethylene dichloride. The resulting compound is then condensed with the chloromercury salt of 2-methylmercapto-6-dimethylaminopurine to form the desired aminoglycosidopurine.

A wide variety of aminoglycosidopurines may be prepared in accordance with the above-described method. For example, one may prepare compounds having hydrogen, alkyl, amino, aryl, alkylamino, dialkylamino, arylamino, diarylamino, mercapto, alkylmercapto, arylmercapto and halogen substituents, interchangeably, in the 2, 6 and 8 positions of the purine moiety, as well as pentose and hexose glycosides containing amino, aralkylamino, acylamino, alkylamino and dialkylamino substituents in any one of the positions bearing a substitutable free hydroxyl group. Ribose, arabinose, lyxose, xylose, glucose, galactose and mannose are examples of sugars which may be attached to the purine moiety in accordance with the above-described process.

We have now discovered a new series of compounds which are useful as intermediates for the preparation of aminoglycosidopurines possessing utility as trypanosomicidal agents. More specifically, the final product of the present invention—namely, 2 - methylmercapto - 6 - dimethylamino - 9 - (2′ - mesyl - 3′ - acetamino - β - D-arabinofuranosyl)purine may be converted to the biologically active 6-dimethylamino-9-(3′-amino-β-D-ribofuranosyl)purine in accordance with a series of reactions, the details of which are set forth in full in a subsequent paragraph hereinbelow. This product is active in vitro against *Trypanosoma equiperdum*. Mice inoculated intraperitoneally with a saline suspension containing 50,000 to 100,000 trypanosomes in 0.2 cc. survive untreated mice after oral administration of 50 mg. of the compound per kg. body weight per day.

The final product of the present invention, 2-methylmercapto - 6 - dimethylamino - 9 - (2′ - mesyl - 3′ - acetamino-β-D-arabinofuranosyl)purine, is obtained through a novel series of intermediate steps involving the formation of a new class of compounds. It is intended that the final product, the intermediates leading thereto and methods for their preparation be included within the scope of this invention.

The compounds of the present invention are those having the general formula:

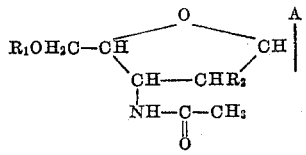

wherein A is a purinyl radical such as 2-methylmercapto-6-dimethylamino purinyl, $R_1$ is a member selected from the group consisting of hydrogen and trityl radicals and $R_2$ is a member selected from the group consisting of hydroxyl and mesyloxy radicals.

The compound 2-methylmercapto-6-dimethylamino-9-(2′,3′-anhydro-β-D-lyxofuranosyl)purine is employed as the starting material in the present invention. The method of preparing this compound is disclosed fully in our copending U. S. application S. N. 493,832, filed concurrently herewith. This compound may be prepared by converting α-D-xylofuranose tetrabenzoate to xylose 2,3,5-tribenzoate according to the method of Fletcher [J. A. C. S., 75, 2624 (1953)]. The corresponding 1-chloro sugar is obtained by treating this compound with anhydrous ether saturated with hydrogen chloride containing acetyl chloride. The 1-chloro sugar is condensed with the chloromercury derivative of 2-methylmercapto-6-dimethylaminopurine in refluxing xylene to give 2-methylmercapto - 6 - dimethylamino - 9 - β - D - xylofurnasoylpurine tribenzoate. O - debenzoylation with methanolic sodium methoxide yields the xylofuranosylpurine which, upon condensation with acetone in the presence of ethanesulfonic acid and copper sulfate, yields 2 - methylmercapto - 6 - dimethylamino - 9 - (3′,5′ - isopropylidene-β-D - xylofuranosyl)purine. Upon contact with methanesulfonyl chloride and pyridine, the corresponding 2′-mesylate derivative is obtained. The isopropylidene blocking group is then selectively cleaved by treatment with aqueous acetic acid yielding 2-methylmercapto - 6 - dimethylamino - 9 - (2′ - mesyl - β - D-xylofuranosyl)purine which, upon contact with methanolic sodium methoxide at reflux temperature yields the desired 2-methylmercapto - 6 - dimethylamino - 9 - (2′,3′-anhydro-β-D-lyxofuranosyl)purine.

In accordance with the preferred embodiment of our invention, the compound 2-methylmercapto-6-dimethylamino - 9 - (2′,3′-anhydro-β-D-lyxofuranosyl)purine is treated with alcoholic ammonia, preferably methanolic ammonia, to give 2-methylmercapto-6-dimethylamino-9-(3′ - amino-β-D-arabinofuranosyl)purine. The reaction, which proceeds smoothly and is preferably carried out at about 100° C. in a steel bomb in a period of about 2 hours, is selective in that the ammonia attack occurs at carbon 3′, although expectedly such attack could take place at carbon 2′ to yield the isomeric 2′-aminoxylopurine. In lieu of methanol one may employ methoxyethanol, ethoxyethanol or any lower alkyl alcohol such as ethyl, propyl, isopropyl, butyl or isobutyl. The time and temperature may be varied within prescribed limits, the lower the temperature employed, the longer time being required for the reaction to reach completion. The temperature may be varied from 50° C. to about 120° C., the time from 20 minutes to 20 hours.

Treatment of the 3′-aminoarabinofuranosylpurine with aqueous acetic acid and acetic anhydride yields the corresponding 3′-acetamino derivative. The reaction is one involving selective acylation of the amino group, leaving the hydroxyl groups unreacted. For this reason, it is preferred to carry out the reaction in the presence of a solvent containing hydroxy groups. If a non-hydroxylated solvent is employed, undesirable acylation of the hydroxyl groups on the sugar occurs. The reaction may be carried out at temperatures from about 10° C. to about 80° C., room temperature being preferred, and requires from 1 to 10 minutes for completion.

At this stage of the synthesis, it is necessary to obtain the 2'-mesylate derivative as the necessary intermediate for the inversion of the group at carbon 2'. It is necessary, however, to first block preferentially the more reactive 5'-hydroxyl group. The blocking group of choice for this purpose is the trityl which may be introduced by reacting the 3'-acetamino-arabinofuranosylpurine with triphenylchloromethane in the presence of a tertiary amine. The triphenylchloromethane reacts selectively with the primary hydroxyl group, leaving the 2'-hydroxyl intact. Pyridine is the preferred tertiary amine although other reagents of like character such as triethylamine, quinoline or collidine may also be employed. The pyridine serves the dual function of a solvent and acid acceptor for the acid liberated during the reaction. The reaction may be carried out at temperatures varying from 20° C. to about 120° C., 50° C. being preferred, from a period of about 6 hours to 7 days, a time of 3 days at 50° C. being optimal. The end product at this step of the reaction is 2-methylmercapto-6-dimethylamino-9-(3'-acetamino-5'-trityl-β-D-arabinofuranosyl)purine.

Mesylation of the trityl-arabinofuranosylpurine with methanesulfonyl chloride in the presence of a reagent such as pyridine yields the corresponding 2'-mesyl derivative. The 5'-trityl group is now removed by treatment with an organic acid which is sufficiently soluble in water such as acetic acid. Upon contact with aqueous acetic acid at a temperature of from about 60° C. to 110° C. for a period of 10 minutes to 1 hour, the 2'-mesyl-3'-acetamino-5'-tritylarabinofuranosylpurine is converted to the corresponding 5'-hydroxyl derivative which is the desired final product 2-methylmercapto-6-dimethylamino-9-(2'-mesyl-3'-acetamino-β-D-arabinofuranosyl)purine.

The usefulness of the final product resulting from the chemical transformations of the present invention—namely, 2 - methylmercapto-6-dimethylamino-9-(2'-mesyl-3'-acetamino-β-D-arabinofuranosyl)purine, can be exemplified by contacting said compound with sodium acetate and dilute methoxyethanol. Displacement of the 2'-mesylate by the neighboring 3'-acetamido group occurs with inversion to the intermediate oxazoline ring compound. The ring is spontaneously ruptured by the water present in the reaction mixture. Acetylation then gives 2 - methylmercapto-6-dimethylamino-9-(2',5'-diacetyl-3'-acetamino-β-D-ribofuranosyl)purine. Removal of the 2-methylmercapto group with desulfurizing Raney nickel gives 6 - dimethylamino-9-(2',5'-diacetyl-3'-acetamido-β-D-ribofuranosyl)purine. This compound, upon treatment with methanolic sodium methoxide may be selectively O-de-acylated to yield the corresponding purine and then further hydrolyzed with barium hydroxide to give the physiologically active 6-dimethylamino-9-(3'-amino-β-D-ribofuranosyl)purine. As stated above, this compound inhibits in vitro the causative microorganism of sleeping sickness *Trypanosoma equiperdium*. It is also active in vivo in mice infected with *T. equiperdium*. The mechanism of activity is unknown at present but it is believed that the compound acts by inhibiting the overall metabolism of the parasites by means of cell division.

The following examples are intended to illustrate, but not limit, the scope of the present invention. All parts are by weight unless otherwise indicated.

Example I

A mixture of 0.200 part by weight of 2-methylmercapto-6 - dimethylamino - 9-(2',3'-anhydro-β-D-lyxofuranosyl)-purine and 25 ml. of methanol saturated with ammonia was heated in a steel bomb at 100° C. for 4 hours. The solution was clarified with activated charcoal and evaporated to dryness under reduced pressure. The residue was dissolved in 5 parts by volume of methanol and filtered through diatomaceous earth. Evaporation to dryness under reduced pressure left a glass which was crystallized from 1 part by volume of methanol by addition of ethyl acetate to turbidity, yielding 2-methylmercapto - 6-dimethylamino-9-(3'-amino-β-D-arabinofuranosyl)purine, M. P. 188° C. to 189° C., yield, 58%. Recrystallization from water gave white crystals, M. P. 193° C. to 195° C. This compound is soluble in alcohol, pyridine or hot water, but insoluble in ethyl acetate, benzene or cold water.

Example II

A mixture of 1.00 part by weight of 2-methylmercapto-6 - dimethylamino-9-(2',3'-anhydro-β-D-lyxofuranosyl)-purine and 40 parts by volume of methanol saturated with ammonia was heated at 100° C. in a steel bomb for 2 hours. The solution was evaporated to dryness leaving a glassy residue which crystallized when warmed with 15 parts by volume of water, yielding 2-methylmercapto-6-dimethylamino-9-(3'-amino-β-D-arabinofuranosyl)purine, M. P. 191° C. to 192° C., yield, 79%.

Example III

To a solution of 0.800 part by weight of 2-methylmercapto-6-dimethylamino-9-(3' - amino-β-D-arabinofuranosyl)purine in 4 parts by volume of 50% acetic acid was added 0.33 part by volume of acetic anhydride. After 8 minutes the solution was evaporated to dryness under reduced pressure. The glassy residue was crystallized by trituration with 5 parts by volume of hot ethyl acetate, yielding 2 - methylmercapto-6-dimethylamino-9-(3'-acetamino-β-D-arabinofuranosyl)purine, M. P. 191° C. to 193° C., yield, 88%. Recrystallization from a mixture of ethyl acetate and absolute alcohol afforded white crystals, M. P. 193° C. to 195° C. This compound is soluble in water or alcohol, but insoluble in ethyl acetate or benzene.

Example IV

A solution of 0.793 part by weight of 2-methylmercapto-6-dimethylamino-9-(3' - acetamino - β - D - arabinofuranosyl)purine and 0.638 part by weight of triphenylmethyl chloride in 4 parts by volume of reagent pyridine was heated at 51° C. for 72 hours protected from moisture. The cooled solution was diluted with 15 parts by volume of chloroform, then 30 parts by volume of water. Solid sodium bicarbonate was added until the mixture was slightly basic. The organic layer was separated, dried with magnesium sulfate and evaporated to dryness under reduced pressure. The residue was dissolved in toluene and the evaporation repeated, leaving 2-methylmercapto-6-dimethylamino-9-(3'-acetamino-5'-trityl-β-D - arabinofuranosyl)purine as a glass. This compound is soluble in chloroform, toluene or pyridine, but insoluble in water or heptane.

Example V

A solution of 1.12 parts by weight of 2-methylmercapto-6-dimethylamino-9-(3'-acetamino-5'-trityl-β - D - arabinofuranosyl)purine and 0.336 part by volume of methanesulfonyl chloride in 11.2 parts by volume of dry pyridine was heated at 51° C. for 22 hours protected from moisture. The mixture was diluted with 55 parts by volume of water and extracted with three 20 parts by volume portions of chloroform. The combined extracts, washed with aqueous sodium bicarbonate and dried with magnesium sulfate, were evaporated to dryness under reduced pressure. The residue was evaporated with 10 parts by volume of toluene under reduced pressure, leaving 2-methylmercapto-6-dimethylamino-9-(2'-mesyl-3'-acetamino-5'-trityl-β-D-arabinofuranosyl)purine as an amorphous solid, yield, 87%. This compound is soluble in chloroform or pyridine, but insoluble in water or heptane.

Example VI

A mixture of 0.790 part by weight of 2-methylmercapto-6-dimethylamino-9-(2'-mesyl-3'-acetamino-5'-trityl-β-D-arabinofuranosyl)purine and 15.8 parts by volume of 80% acetic acid was heated at 100° C. for 20 minutes after solution was complete. The solution was diluted with 100 parts by volume of water and washed with two 100 parts by volume portions of hot heptane to remove triphenylcarbinol. The aqueous solution was filtered, then evaporated to dryness under reduced pressure, leaving 2-methylmercapto-6-dimethylamino-9-(2' - mesyl - 3'-acetamino-β-D-arabinofuranosyl)purine as a glass, yield, 75%. This compound is soluble in alcohol or acetone, but insoluble in cold water or heptane.

Example VII

A solution of 0.390 part by weight of 2-methylmercapto-6-dimethylamino-9-(2'-mesyl-3'-acetamino - β - D - arabinofuranosyl)purine and 0.282 part by weight of anhydrous sodium acetate in 4 parts by volume of methoxyethanol containing 5% water was refluxed for 23 hours. Evaporation to dryness under reduced pressure left a solid which was heated at 100° C. with 4 parts by volume of pyridine and 4 parts by volume of acetic anhydride for 1 hour. The mixture was diluted with 25 parts by volume of water and extracted with four 15 parts by volume portions of chloroform. The combined extracts, dried with magnesium sulfate, were evaporated to dryness under reduced pressure, leaving 2-methylmercapto-6-dimethylamino-9-(2',5'-diacetyl-3'-acetamino - β - D-ribofuranosyl)purine as an amorphous solid, yield, 71%. The compound was soluble in alcohol or chloroform, but insoluble in water or heptane.

Example VIII

A solution of 0.280 part by weight of 2-methylmercapto-6-dimethylamino-9-(2',5'-diacetyl-3'-acetamino - β - D-ribofuranosyl)purine in 50 parts by volume of methoxyethanol was stirred at 100° C. with about 1.5 parts by weight of desulfurizing Raney nickel for 1 hour. The mixture was filtered through diatomaceous earth. The combined filtrate and washings were evaporated to dryness under reduced pressure, leaving 0.135 part of a glass. Crystallization from ethyl acetate afforded 6-dimethylamino-9-(2',5'-diacetyl-3'-acetamino-β - D - ribofuranosyl)purine, M. P. 182° C. to 183° C., yield, 24%. Recrystallization from ethyl acetate gave white crystals, M. P., 188° C. to 189° C.

We claim:

1. A compound selected from the group consisting of those arabinosides having the general formula:

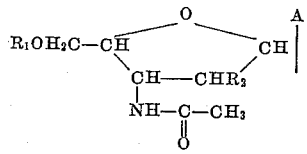

wherein A is a purinyl radical, $R_1$ is a member selected from the group consisting of hydrogen and trityl radicals and $R_2$ is a member selected from the group consisting of hydroxyl and mesyloxy radicals.

2. The compound 2-methylmercapto-6-dimethylamino-9-(3'-acetamino-5'-trityl-β-D-arabinofuranosyl)purine.

3. The compound 2-methylmercapto-6-dimethylamino-9-(2'-mesyl-3'-acetamino-5'-trityl-β-D-arabinofuranosyl)purine.

4. The compound 2-methylmercapto-6-dimethylamino-9-(2'-mesyl-3'-acetamino-β-D-arabinofuranosyl)purine.

References Cited in the file of this patent

UNITED STATES PATENTS

| | | |
|---|---|---|
| 2,719,843 | Davoll et al. | Oct. 4, 1955 |
| 2,763,642 | Porter et al. | Sept. 18, 1956 |

OTHER REFERENCES

Pigman et al.: "Advances in Carbohydrate Chemistry," publ. by Academic Press (N. Y.), 1945 (page 207 relied on).

Pigman et al.: "Carbohydrate Chemistry," publ. by Academic Press (N. Y.), 1948 (pp. 174, 346 and 413 to 419 relied on).

Baker et al.: "Journal Organic Chemistry," November 1954, vol. 19, No. 11 (pp. 1780 to 1782 relied on).

Hewitt et al: "Antibiotics and Chemotherapy," December 1954, p. 1222 relied on.